United States Patent [19]

Dorsey et al.

[11] Patent Number: 4,573,068

[45] Date of Patent: Feb. 25, 1986

[54] VIDEO SIGNAL PROCESSOR FOR PROGRESSIVE SCANNING

[75] Inventors: Denis P. Dorsey, Levittown, Pa.; Walter E. Sepp, Plainsboro; Dalton H. Pritchard, Princeton, both of N.J.

[73] Assignee: RCA Corporation, Princeton, N.J.

[21] Appl. No.: 591,996

[22] Filed: Mar. 21, 1984

[51] Int. Cl.$^4$ ............... H04N 11/20; H04N 11/04; H04N 9/67; H04N 9/64
[52] U.S. Cl. .............................. 358/11; 358/13; 358/30; 358/37
[58] Field of Search ............ 358/11, 13, 30, 140, 358/37, 12

[56] References Cited

U.S. PATENT DOCUMENTS

| | | | |
|---|---|---|---|
| 4,365,266 | 12/1982 | Lagoni | 358/37 |
| 4,425,581 | 1/1984 | Schweppe et al. | 358/140 X |
| 4,509,071 | 4/1985 | Fujimura et al. | 358/11 |
| 4,521,802 | 6/1985 | Ikeda | 358/11 |
| 4,524,379 | 6/1985 | Okada et al. | 358/11 |
| 4,530,004 | 7/1985 | Achiha et al. | 358/11 |

Primary Examiner—Michael A. Masinick
Assistant Examiner—Michael P. Dunnam
Attorney, Agent, or Firm—P. J. Rasmussen; P. M. Emanuel; R. G. Coalter

[57] ABSTRACT

In a video signal processor for a progressive scanning system, an interlaced composite video signal, repeating at an $f_H$ line rate of approximately 16 KHz, is coupled to a comb filter. Separated luminance and chrominance signals are developed at respective output terminals of the comb filter. The chrominance signal is demodulated to develop color mixture signals. The luminance and color mixture signals are applied to a color matrix for generating a first set of R, G, B color signals, with each signal repeating at the $f_H$ line rate. A time compression circuit is coupled to the output of the color matrix for time compressing the R, G, B color signals to generate a comparable set of three time compressed and processed color signals, with each time compressed signal repeating at a double line rate of $2f_H$. The video signal processor is also capable of converting $f_H$ line rate, interlaced R, G, B signals, obtained from an external video source, into double line rate, non-interlaced signals. A switching arrangement is coupled to the color matrix, the external source and the time compression circuit to selectively apply to the time compression circuit, either the R, G, B signals derived from the source of the composite video signal or those directly obtained from the external source.

9 Claims, 4 Drawing Figures

VIDEO SIGNAL PROCESSOR FOR PROGRESSIVE SCANNING

This invention relates to a video signal processor for a progressive scanning system that converts line rate, interlaced video signals into double line rate, non-interlaced video signals.

Recent interest in the development of high definition television systems has been directed to techniques intended to enhance the subjective performance of present systems within the constraints of existing standards. In one approach, progressive or non-interlaced scanning is used. The incoming video signal, supplied in a conventional two-to-one vertical interlaced format, is first stored in a memory and then subsequently read out of the memory at a double line rate in a non-interlaced or a line progressively scanned manner. Each line of incoming video generates two lines of displayed video.

An example of such a video signal processor is the one described in U. S. patent application Ser. No. 526,700, filed Aug. 26, 1983 by D. H. Pritchard, entitled, PROGRESSIVE SCAN TELEVISION DISPLAY SYSTEM EMPLOYING INTERPOLATION IN THE LUMINANCE CHANNEL, herein incorporated by reference. The incoming video signal, repeating at the line rate of $f_H$, or approximately 16 KHz, is digitized and applied to a digital comb filter to generate digital samples of luminance and chrominance signals, each repeating at the line rate. A color demodulator develops color mixture signals such as I and Q signals from the chrominance signal. The Y, I, Q signals are stored in several 1-H memories and then read out of the memories at a double line rate. The double line rate Y, I and Q signals are then coupled to a color matrix to generate double line rate R, G and B primary color signals for a progressively scanned display.

In accordance with an aspect of the invention, speed-up of the video signals to a multiple line rate, such as a double line rate, is performed at the point in the processing chain after the R, G, B primary color signals are developed, rather than at an earlier point such as when the Y, I and Q signals are developed. Several advantages ensue in performing the speed-up at the end of the signal processing chain, rather than at some intermediate point. As an example of one advantage, if the color matrixing is performed digitally, then the digital matrixing of the luminance and color mixture signals is performed at a slower speed than when these signals are matrixed after speed-up.

As an example of another advantage to performing $2f_H$ speed-up at the R, G, B point, computer generated $f_H$ line rate R, G, B signals may be converted to double line rate non-interlaced form merely by using a switching arrangement at the input to the speed-up stage to substitute the external R,G,B signals for the composite video derived R,G,B, signals.

Figure 1:
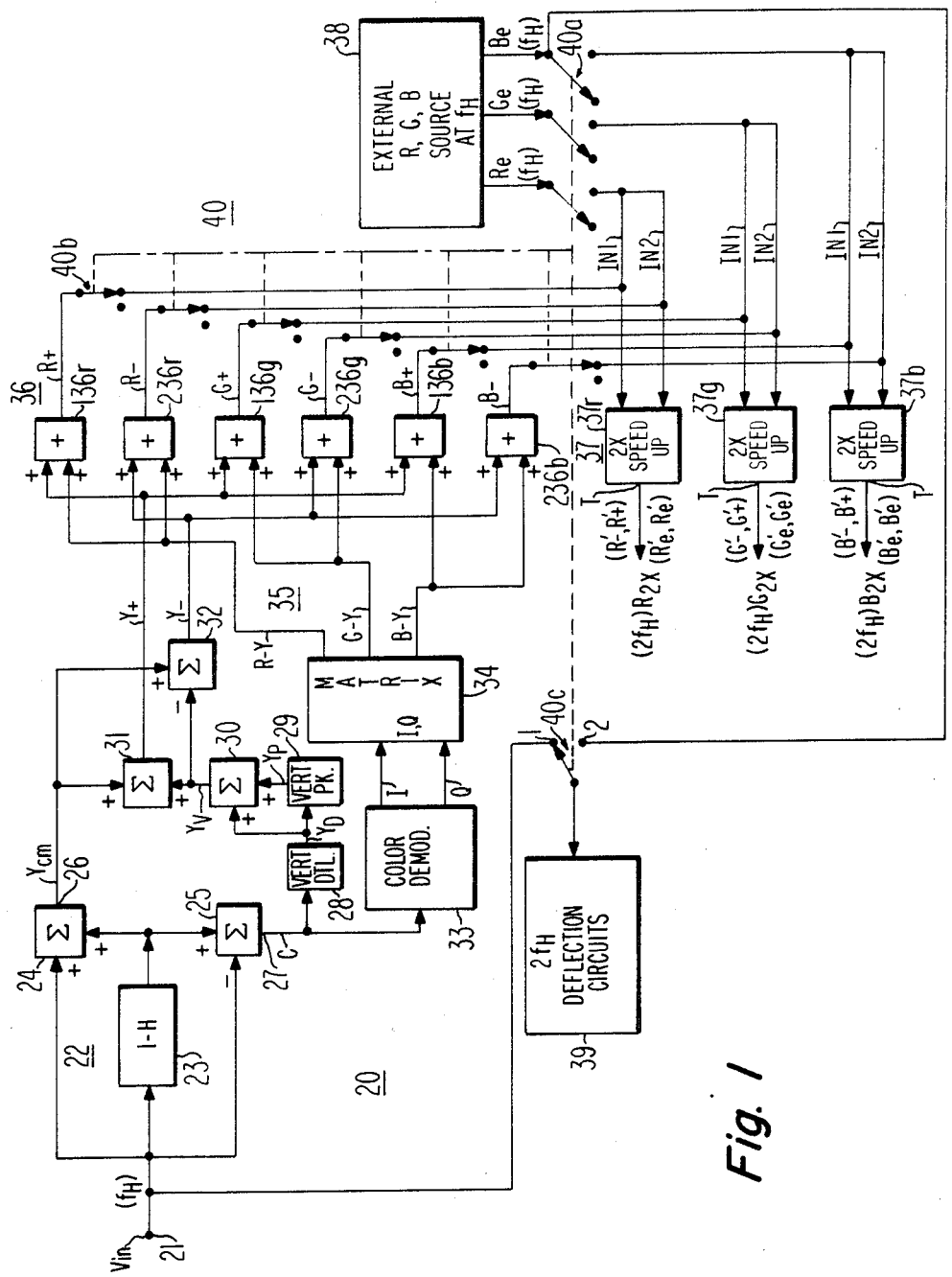
FIG. 1 illustrates a first embodiment of a video signal processor for progressive scanning, in accordance with the invention.

In the video signal processor 20 of FIG. 1, suitable for use in a progressive scanning system, a composite video signal $V_{in}$ is developed at a terminal 21. Composite video signal $V_{in}$ may comprise a conventional NTSC color signal, having 525 lines per frame in a two-to-one interlaced format, with each line of video being developed during an interval $1/f_H$.

Composite video signal $V_{in}$ is coupled via a contact terminal #1 of a single-pole-double-throw-switch 40c of a switching stage 40 to deflection circuits 39. The synchronizing portion of video signal $V_{in}$ synchronizes operation of the double line rate scanning deflection circuits to the picture content of the incoming video signal $V_{in}$.

Composite video signal $V_{in}$ is coupled to a comb filter 22 comprising a 1-H delay line 23, an adder 24 and a subtractor 25, for separating the luminance signal from the chrominance signal in the composite video signal. The 1-H delay line 23 contains sufficient storage cells to adequately sample a single line of incoming video. The clock sampling frequency of delay line 23 is determined in accordance with the number of samples to be obtained over one line period, $1/f_H$, of the incoming video signal $V_{in}$. A separated luminance signal $Y_{cm}$, repeating at a $1/f_H$ line rate, is developed at an output terminal 26 of comb filter 22, and a separated chrominance signal C, repeating at a $1/f_H$ line rate, is developed at an output terminal 27.

Chrominance signal C is coupled to a color demodulator 33 that develops color mixture signals such as the I and Q signals. The I and Q signals are applied to a color matrix 35 that includes an I,Q matrix 34 and an adder stage 36. Adder stage 36 comprises three adders 136r,g,b and three adders 236r,g,b. I,Q matrix 34 combines the I and Q signals to develop the three color difference signals R-Y, G-Y, B-Y, at the output of the matrix. Each of the color difference signals is generated at the $f_H$ line rate.

The combing process that generates separated luminance signal $Y_{cm}$ results in a reduction of the vertical detail luminance information or the loss of vertical luminance resolution. This result is partially due to the fact that some of the vertical detail information is separated by comb filter 22 into the chrominance signal C due to the line averaging performed by the comb filter.

The vertical detail information is relatively low frequency information, below, for example, 1 megahertz in frequency. To restore into the luminance channel, luminance vertical detail contained in the chrominance signal, chrominance signal C is coupled to a vertical detail separation stage 28. Vertical detail separation stage 28 may comprise, for example, a low pass filter having a cutoff frequency in the range of 750 kilohertz to 1 megahertz.

The relatively low frequency vertical detail luminance signal $Y_D$ developed at the output of stage 28, is coupled to a nonlinear processing vertical peaking stage 29.

The vertical peaking signal $Y_P$ developed at the output of stage 29 is coupled to an adder 30 as is the vertical detail sign $Y_D$ to produce a luminance vertical detail enhancement signal $Y_V$. Vertical detail enhancement signal $Y_V$ is used to sharpen vertical transitions between black and white by emphasizing preshoots and/or overshoots of signal transitions. Vertical detail enhancement signal $Y_V$ restores the vertical detail information to the combed luminance signal $Y_{cm}$ in a manner described below.

Video processor 20 uses a line interpolation technique to produce non-interlaced scanning of a picture, wherein each line of incoming video generates two lines of time compressed video to be displayed on successive non-interlaced display lines of the television receiver. A number of such line interpolation techniques is described in the aforementioned U.S. patent application of D. H. Pritchard and in U.S. patent application Ser. No. 526,702, filed Aug. 26, 1983, by D. H. Pritchard and W. E. Sepp, entitled, PROGRESSIVE SCAN TELEVISION SYSTEM EMPLOYING VERTICAL DETAIL ENHANCEMENT, herein incorporated by reference. Video signal processor 20 uses a modified form of the interpolation techniques described in these patent applications.

To properly display the enhanced vertical detail information in a pair of display lines, the enhanced vertical detail information is reversed in polarity in alternate display lines. To produce the reversal in polarity from line to line in the progressively scanned display lines, the enhanced vertical detail luminance signal $Y_V$ is coupled to an adder 31 and to the negative input of a subtractor 32. The combed luminance signal $Y_{cm}$ is also coupled to adder 31 and to the positive input of subtractor 32. A restored luminance signal $Y_+$ is developed at the output of adder 31. A restored luminance signal $Y_-$ is developed at the output of subtractor 32.

The restored luminance signals $Y_+$ and $Y_-$ contain the luminance information of the incoming composite video signal $V_{in}$, including restored and enhanced vertical detail information. The restored luminance signal $Y_+$ has the enhanced vertical detail information restored in one polarity, and the restored luminance signal $Y_-$ has the enhanced vertical detail information restored in the opposite polarity.

Restored luminance signal $Y_+$ is coupled to adders 136r, 136g, 136b of adder stage 36 of color matrix 35. Restored luminance signal $Y_-$ is coupled to adders 236r, 236g and 236b. The R-Y color difference signal obtained from I,Q matrix 34 is coupled to adders 136r and 236r. The G-Y signal is coupled to adders 136g and 236g, and the B-Y signal is coupled to adders 136b and 236b.

The output of adder 136r is the red primary color signal $R_+$ having luminance enhanced vertical detail information of a first polarity, and the output of adder 236 is the red primary color signal $R_-$ having luminance enhanced vertical detail information of the opposite polarity. The output of adder 136g is the green primary color signal $G_+$ having luminance enhanced vertical detail information of the first polarity, and the output of adder 236g is the green primary color signal $G_-$ having luminance enhanced vertical detail information of the opposite polarity. The output of adder 136b is the blue primary color signal $B_+$ having luminance enhanced vertical detail information of the first polarity, and the output of adder 236b is the blue primary color signal $B_-$ having luminance enhanced vertical detail information of the opposite polarity. Each of the red, green and blue color signals $R_\pm$, $G_\pm$, $B_\pm$ is generated at the $f_H$ line rate.

To provide speeded-up or time compressed, double line rate, red, green and blue color video signals $R_{2x}$, $G_{2x}$, $B_{2x}$, the red, green, blue output of color matrix 35 is coupled via a six-pole-single-throw switch 40b of switching stage 40 to a time compression circuit or speed-up stage 37. The two red color signals $R_\pm$ are coupled to respective input lines IN1 and IN2 of speed-up unit 37r. The two green color signals $G_\pm$ are coupled to respective input lines IN1 and IN2 of speed-up unit 37g. The two blue color color signals $B_\pm$ are coupled to respective input lines IN1 and IN2 of speed-up unit 37b.

Speed-up unit 37r time compresses each of the two input signals by a factor of two to develop respective time compressed signals $R'_+$ and $R'_-$, each of duration $1/(2f_H)$, that are multiplexed onto output signal line T to develop the signal $R_{2x}$.

The lines of double line rate signal $R_{2x}$ alternate between a line of the time compressed signal $R'_-$ and a line of the time compressed signal $R'_+$. The alternation is such that, for a given pair of signals, $R'_-$ and $R'_+$, associated with a given line of incoming video signal, $V_{in}$, the information contained in the $R'_-$ signal is displayed in the display line that is located above the adjacent display line that displays the information contained in the $R'_+$ signal. This particular sequencing of of $R'_-$ and $R'_+$ signals produces correctly phased vertical peaking of the non-interlaced display signal.

Speed-up units 37g and 37b operate in a manner similar to that described for speed-up unit 37r. Speed-up unit 37g develops a double line rate green signal $G_{2x}$ that alternates between time compressed lines of the green signals $G'_-$ and $G'_+$. Speed-up unit 37b develops a double line rate blue signal $B_{2x}$ that alternates between time compressed lines of the blue signals $B'_-$ and $B'_+$.

Figure 3:
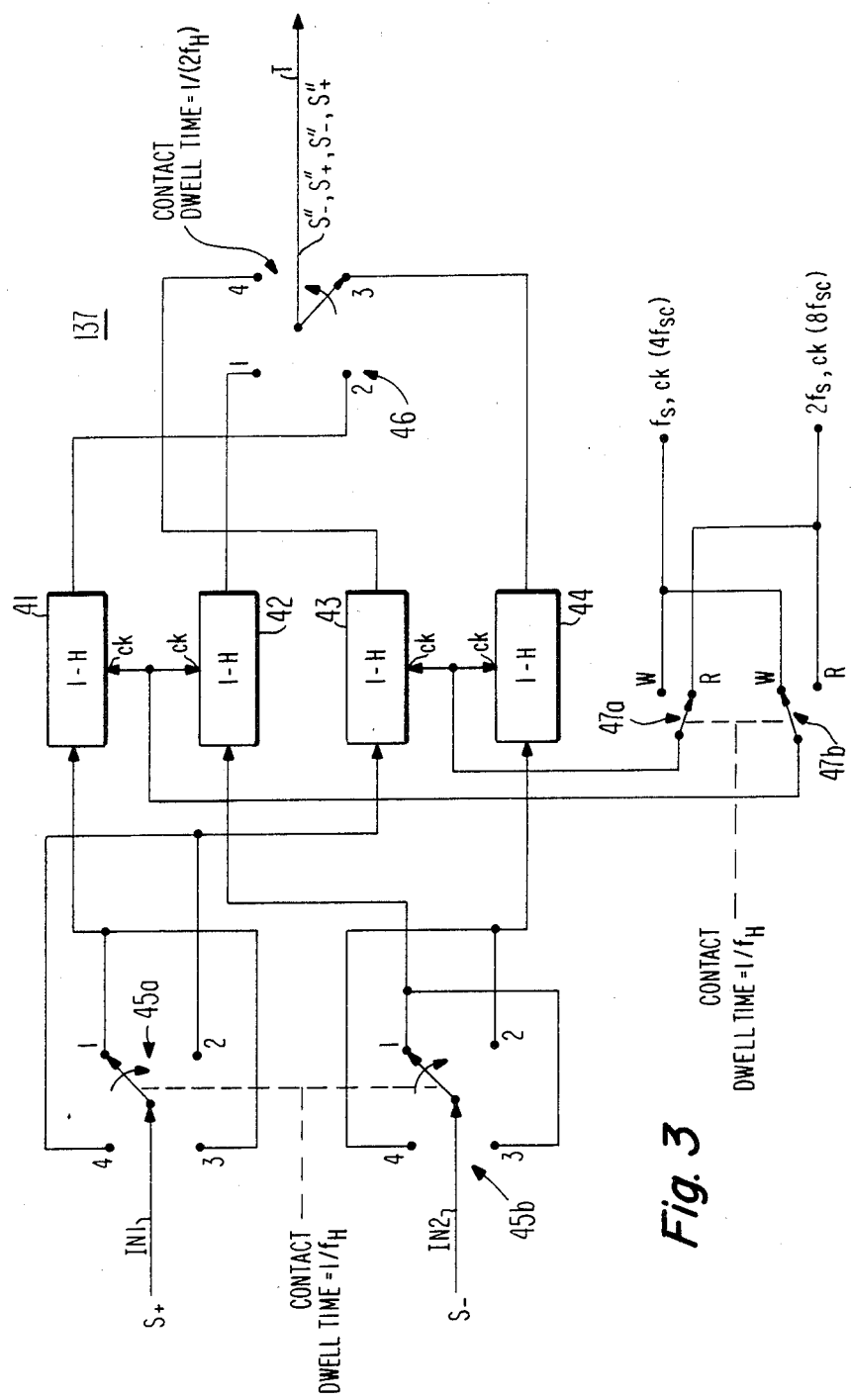
FIG. 3 illustrates a detailed embodiment of a speed-up unit used in the video signal processor of FIG. 1.

FIG. 3 illustrates a specific embodiment 137 of a speed-up unit that may be used as any one of the speed-up units 37r, 37g and 37b of FIG. 1. Other embodiments of speed-up units which may be used in FIG. 1 are described in U.S. patent application Ser. No. 526,701 filed Aug. 26, 1983, by W. E. Sepp, entitled, PROGRESSIVE SCAN SPEED-UP PROCESSOR, herein incorporated by reference.

In FIG. 3, speed-up unit 137 comprises four 1-H memories 41 through 44, an input switching arrangement comprising switches 45a and 45b in ganged operation, an output switch 46 and a memory clock switching arrangement comprising switches 47a and 47b in ganged operation. Switches 45a, 45b and 46, each have four contact terminals 1 through 4. Input line IN1 is coupled to the pole of switch 45a, input line IN2 is coupled to the pole of switch 45b and output line T is coupled to the pole of switch 46.

The arms of switches 45a and 45b rotate in a clockwise direction, sequentially contacting their respective terminals 1 through 4. The arm of switch 46 rotates in a counter-clockwise direction, sequentially contacting its terminals 1 through 4. The dwell time of the arm of either switch 45a or 45b at any one of its contact terminals is the duration $1/f_H$. The dwell time of the arm of switch 46 at any one of its contact terminals is the duration $1/(2f_H)$, a duration half that of the dwell time of switches 45a and 45b.

The signal $S_+$ of FIG. 3 developed on input line IN1 represents any one of the red, green and blue vertically enhanced signals $R_+$, $G_+$, $B_+$ of FIG. 1 that repeats at the $f_H$ line rate. The signal $S_-$ of FIG. 3 developed on input line IN2 represents the corresponding one of the signals $R_-$, $G_-$, $B_-$. The signal $S_+$ is stored sequentially, line-by-line, in memories 41 and 43. The signal $S_-$ is stored sequentially, line-by-line, in memories 42 and 44.

The capacity of each of the memories 41 through 44 is sufficient to adequately sample the highest frequencies of interest. This criteria determines the write clock rate of the clock signal $f_s$,ck, applied to the clock terminals CK of each of the memories 41 through 44. The write clock rate, $f_s$, illustratively may be $4f_{sc}$ where $f_{sc}$ is the color subcarrier frequency of illustratively 3.58 megahertz in an NTSC system.

The signals $S_+$ and $S_-$ stored in memories 41 through 44 are read out of the memories by a read clock signal $2f_s$,ck generated at a $2f_s$ rate that is twice the write clock rate. Illustratively, the read clock rate is $8f_{sc}$. The write clock signal is coupled to the W contact terminals of switches 47a and 47b and the read clock signal is coupled to the R contact terminals of the switches. The pole of switch 47a is coupled to the clock terminals CK of line store memories 41 and 42, and the pole of switch 47b is coupled to the clock terminals CK of line store memories 43 and 44.

The synchronized throw positions of the arms of switches 45a, 45b, 46, 47a and 47b are as illustrated in FIG. 3. For example, when the arms of switches 45a and 45b contact their respective terminals 1 during a dwell time of $1/f_H$, the arms of switch 47a contacts terminal R and the arm of switch 47b contacts terminal W. During this interval, the arm of switch 46 first contacts terminal 3 during a dwell time of $1/(2f_H)$ and then contacts terminal 4 during another dwell time of similar duration. In this manner, signals $S_+$ and $S_-$ developed on input lines IN1 and IN2 are time compressed by a factor of two and multiplexed onto output line T, alternating between time compressed signals $S''_-$ and $S''_+$.

The video processing performed in FIG. 1 may be performed either in the analog domain or in the digital domain. When performed in the digital domain, the input composite video signal $V_{in}$ is digitized or sampled by an analog-to-digital converter, not illustrated, before being coupled to terminal 21. Digital circuitry is then used to implement the processing stages illustrated in FIG. 1. The digital signals $R_{2x}$, $G_{2x}$, and $B_{2x}$ are then returned to the analog domain by digital-to-analog converters, not illustrated, before they are coupled to the picture tube driver stages of the television receiver. In accordance with a feature of the invention, by processing the video signal without speed-up until after its conversion into R, G, B form, at the output of color matrix 35, most of the digital processing is performed at relatively low sampling rates.

In accordance with another feature of the invention, video signal processor 20 is capable of expeditiously processing R,G,B signals from an external video source that develops these signals at an $f_H$ rate in an interlaced format. Because speed-up to double line rate occurs only after the incoming video signal $V_{in}$ has been converted into R, G, B form, the external R, G, B signals may be inserted in place of the internally processed ones immediately before the speed-up units receive the signals.

As illustrated in FIG. 1, an external source 38 of R, G, B signals, generates three primary color signals $R_e$, $G_e$, and $B_e$, repeating at the line rate of $f_H$. Signals $R_e$, $G_e$, $B_e$ are are coupled to respective poles of a three-pole-double-throw switch 40a of switching stage 40. Each of the three in-circuit contact terminals of switch 40a is coupled to both input line IN1 and input line IN2 of a respective one of the three speed-up units 37r, 37g, 37b.

The arms of switches 40a, 40b, and 40c in switching stage 40 are ganged together. To process the $R_e$, $G_e$, $B_e$ signals from external source 38, the three arms of switch 40a are thrown to make contact with their in-circuit contact terminals. The six arms of switch 40b are thrown into their open-circuit positions. The arm of switch 40c is thrown to make contact with terminal #2. In this way, the external red signal $R_e$ is coupled to speed-up unit 37r, time compressed by a factor of two to develop the signal $R'_e$ of duration $1/(2f_H)$, and multiplexed onto output line T as the double line rate signa $R_{2x}$. When processing signals from external source 38, signal $R_{2x}$ has the time compressed signal $R'_e$ once-repeated so as to be displayed in two adjacent display lines of the non-interlaced display. Similar situations hold for the processing of the green and blue external video signals $G_e$ and $B_e$ to develop the once-repeated time compressed green and blue video signals $G'_e$ and $B'_e$ of the double line rate signals $G_{2x}$ and $B_{2x}$. In this situation, alternate lines of the $R_{2x}$, $G_{2x}$, $B_{2x}$ signals contain vertical detail information of the same polarity.

To synchronize deflection circuits 39 with the picture content of the external signals, $R_e$, $G_e$, $B_e$, one of these signals, illustratively the signal $B_e$, is coupled to deflection circuits 39 via contact terminal #2 of switch 40c. Deflection circuits 39 extract the synchronizing portion of the video signal $B_e$ to synchronize operation of the double line rate horizontal deflection circuit and of the vertical deflection circuit. Other synchronizing techniques may be used such as having external source 38 provide a fourth output signal that contains separate synchronizing information and coupling the separate synchronizing information to deflection circuits 39 via switch 40c.

As a feature of the invention, one notes that external R, G, B source 38 may be coupled directly to time compression stage 37 without further processing of the red, green and blue signals $R_e$, $G_e$ and $B_e$. These signals are merely time compressed and once-repeated during each $1/f_H$ interval. Typically, external R,G,B source 38 may be a source such as a computer that internally generates R,G,B signals with high horizontal and vertical resolution, compared to the resolution of the combed luminance signa $Y_{cm}$. Thus, the processing that was performed on the incoming composite video signal $V_{in}$ to generate vertical enhancement signal $Y_V$ is not required for the $R_e$, $G_e$, $B_e$ signals. The externally derived $R_e$, $G_e$, $B_e$ signals may be directly inserted onto the input lines of time compression stage 37.

Figure 2:
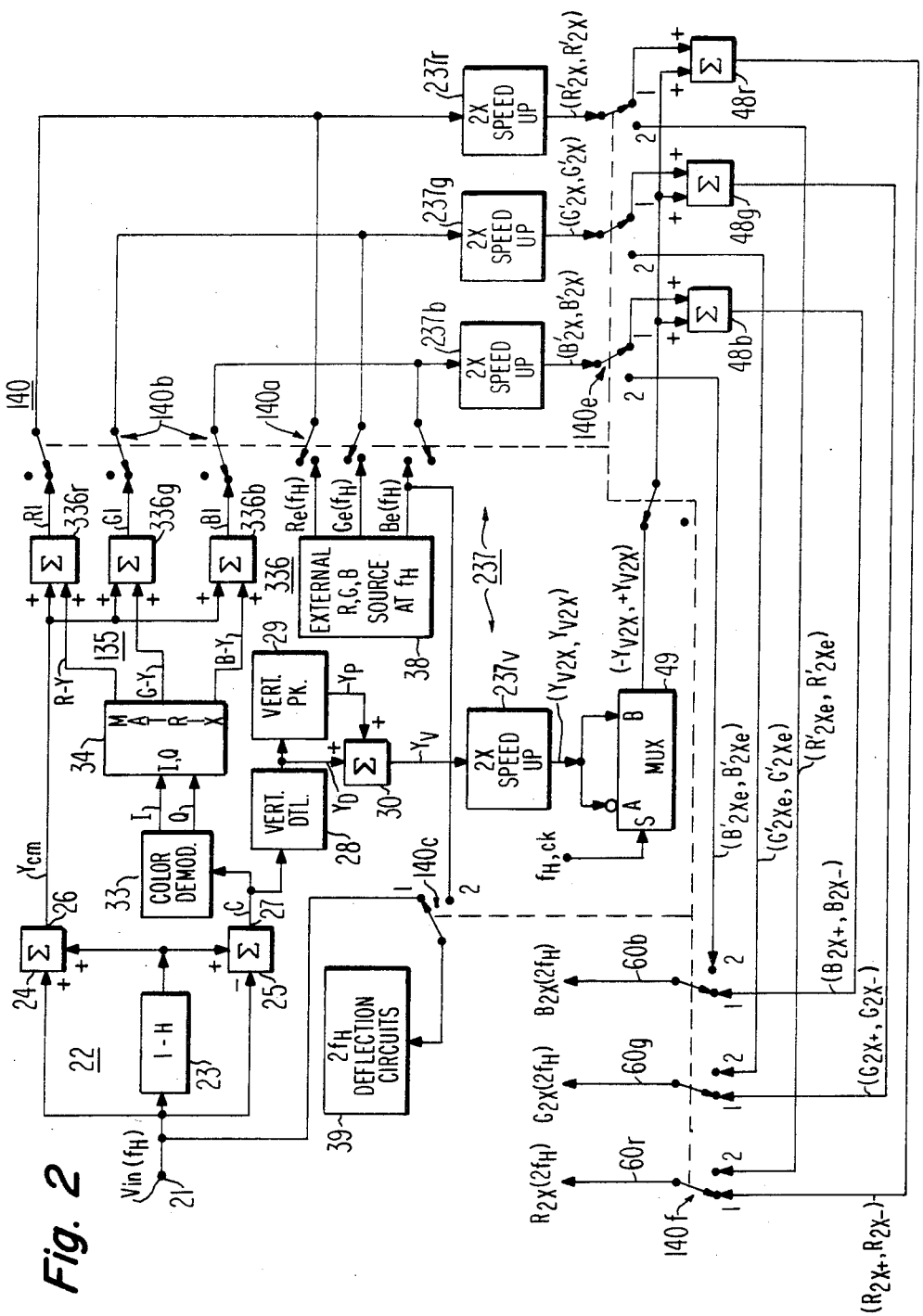
FIG. 2 illustrates a second embodiment of a video signal processor for progressive scanning, in accordance with the invention.

FIG. 2 illustrates another video signal processor 120, in accordance with the invention, that converts an interlaced video signal generated at an $f_H$ line rate into a non-interlaced double line rate R,G,B signal, wherein the memory storage requirements for the time compression or speed-up units are reduced. Items in FIGS. 1 and 2 similarly identified function in a similar manner, or represent similar quantities.

In FIG. 2, the vertical enhancement signal $Y_V$ developed at the output of adder 30 is first time compressed by a factor of two before being restored into the luminance processing channel on a polarity alternating, non-interlaced, line-by-line basis.

The output of I,Q matrix 34 and the combed luminance signal $Y_{cm}$ are added in an adder stage 336 of color matrix 135 to develop a red signal R1 at the output of adder 336r, a green signal G1 at the output of adder 336g, and a blue signal B1 at the output of adder 336b. The R1, G1, B1 signals, each generated at the $f_H$ line rate, are respectively coupled via respective arms of a three-pole-single-throw switch 140b of a switching stage 140 to individual time compression or speed-up units 237r, 237g, 237b, of a time compression or speed-up stage 237.

Each of the speed-up units 237r,g,b time compresses its respective R1, G1, B1 input signal by a factor of two, and repeats each time compressed line. At the outputs of the speed-up units 237r,g,b, are developed the double line rate color signals R'$_{2x}$, G'$_{2x}$, B'$_{2x}$. For each line of incoming video V$_{in}$, there is associated two lines of time compressed video for each of the red, green and blue color signals R'$_{2x}$, G'$_{2x}$, B'$_{2x}$. The duration of each line of each time compressed color signal is 1/(2f$_H$).

The vertical detail enhancement signal Y$_V$ is coupled to a speed-up unit 237v of time compression stage 237. Speed-up unit 237v functions similarly to the other speed-up units to develop a double line rate, time compressed and once-repeated vertical detail enhancement video signal Y$_{V2x}$.

The double line rate, once-repeated video signal Y$_{V2x}$ is directly coupled to the B input of a multiplexer 49 and is also coupled to the A input of the multiplexer after first being inverted in polarity. A square-wave select clock f$_H$,ck is coupled to the select input terminal S of multiplexer 49 to select at the output of the multiplexer either the A or B input signals, $-Y_{V2x}$ or $+Y_{V2x}$. The output of multiplexer 49 alternates between a vertical enhancement signal $-Y_{V2x}$ and a vertical enhancement signal $+Y_{V2x}$ of opposite polarity, each of duration 1/(2f$_H$).

The alternately produced vertical enhancement signals $-Y_{V2x}$, $+Y_{V2x}$, appearing on the output line of multiplexer 49, are coupled to each of the adders 48r, 48g, 48b of an adder stage 48. The once-repeated, double line rate color signals R'$_{2x}$, G'$_{2x}$, B'$_{2x}$ are also coupled to respective adders 48r, 48g, 48b via the respective arms and contact terminals #1 of a switch 140e of switching stage 140. A double line rate red color signal is developed at the output of adder 48r comprising line pairs of time compressed red color signals (R$_{2x-}$,R$_{2x+}$), wherein the vertical detail information of the signal R$_{2x-}$ is of opposite polarity from the vertical detail information of the signal R$_{2x+}$. Similarly, a pair of time compressed signals (G$_{2x-}$,G$_{2x+}$) and (B$_{2x-}$,B$_{2x+}$) are developed at the output of respective adders 48g and 48b.

The outputs of adders 48r,g,b are coupled via respective contact terminals #1 and arms of a switch 140f of switching stage 140 to output signal lines 60r,g,b, to develop double line rate signals R$_{2x}$, G$_{2x}$, B$_{2x}$, such that for a given pair of display lines the displayed vertical detail information are opposing in polarity, with the negative vertical detail information being displayed first.

When an external R,G,B source 38 is selected to provide picture information, the arms of switches 140a and 140b are thrown into their open-circuit position and the arms of switches 140c through 140f are thrown to make contact with their contact terminals #2. The external signals R$_e$, G$_e$, B$_e$ generated by source 38 are coupled to speed-up units 237r,g,b, time compressed by a factor of two to generate the double line rate color signals R'$_{2xe}$, G'$_{2xe}$, B'$_{2xe}$, with each line of time compressed color video signal being repeated once.

Vertical detail restoration may not be needed for the red, green and blue signals generated by external source 38 because such signals already contain sharp vertical resolution. The output of speed-up units 237r,g,b, therefore may be directly coupled via switches 140e and 140f to output lines 60r,g,b, bypassing adder stage 48.

Figure 4:
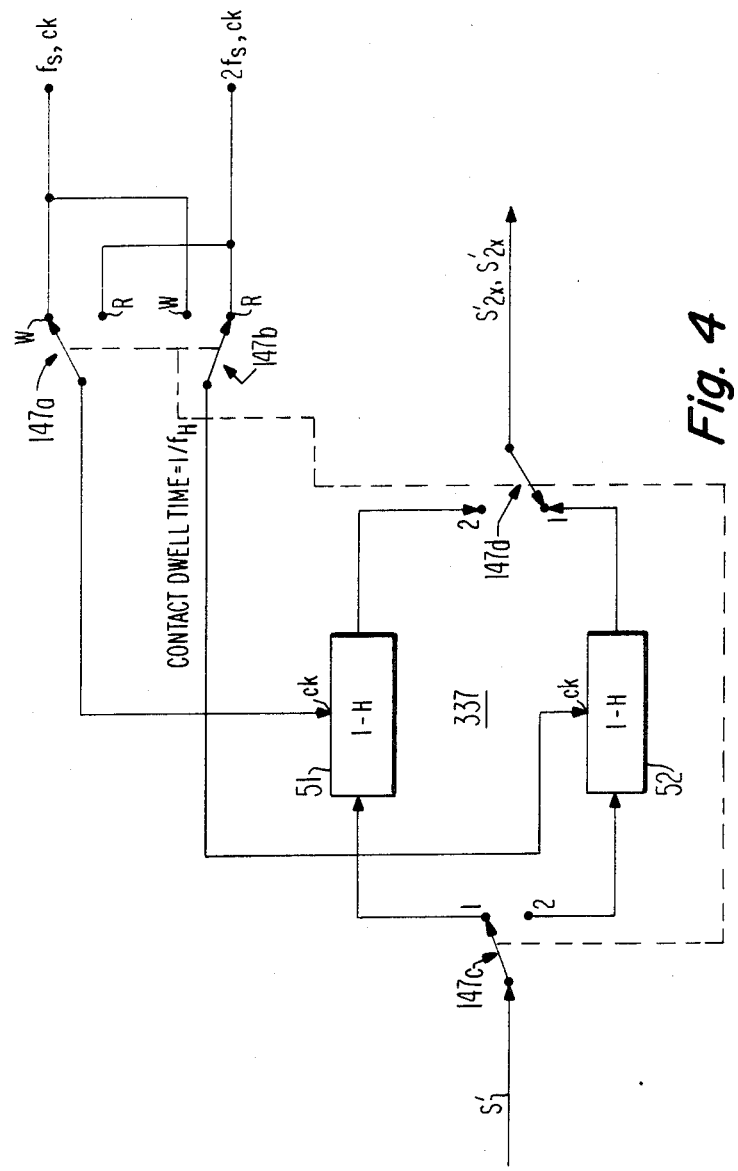
FIG. 4 illustrates a detailed embodiment of a speed-up unit used in the video signal processor of FIG. 2.

FIG. 4 illustrates a detailed embodiment 337 that may be used as any one of the speed-up units of time compression stage 237 of FIG. 2. In FIG. 4, the signal S' represents any one of the signals R', G', B' or any one of the signals R$_e$, G$_e$, B$_e$. The signal S'$_{2x}$ in FIG. 4 represents the corresponding input signal time compressed by a factor of two and repeated once over the full interval 1/f$_H$.

Speed-up unit 337 comprises two 1-H memories 51 and 52, and single-pole-double-throw switches 147a through 147d in ganged operation. The dwell time of each of the respective arms of the switches at a respective contact terminal equals 1/f$_H$. The clock signal f$_s$,ck, generated at an f$_s$ rate, is coupled to contact terminals W of switches 147a and 147b. The clock signal 2f$_s$,ck, generated at a 2f$_s$ rate, is coupled to contact terminals R of switches 147a and 147b.

With the arms of switches 147a through 147d thrown into the positions illustrated in FIG. 4, one line of the signal S' is stored in 1-H memory 51 during a 1/f$_H$ interval. Memories 51 and 52 have sufficient storage capacity to store enough samples of the signal S' so as to adequately sample the highest frequencies contained in the signal. Samples of signal S' are written into memory 51 by coupling clock signal f$_s$,ck to the clock terminal CK.

At the same time that a line of video signal S' is being written into memory 51, the previous line of the video signal, previously stored in memory 52, is read out of the memory by read clock signal 2f$_s$,ck. The read rate from memory 52 is twice the write rate into the memory. Thus, during the interval 1/f$_H$ that it takes to write into memory 51 a line of incoming video signal S', the previous line of video signal is twice read out of memory 52. The double line rate signal S'$_{2x}$ is coupled to the output of speed-up unit 337 via switch 147b.

By not inserting the vertical detail information into the luminance processing chain until after the vertical detail enhancement signal is time compressed, video processor 120 of FIG. 2 makes use of a simplified time compression stage 237 that contains speed-up units 337 of FIG. 4 that need only two 1-H memories, each, for storage capacity. In comparison, time compression stage 37 of video processor 20 in FIG. 1 uses speed-up units 137 of FIG. 2 that contain four 1-H memories, each. Furthermore, because the vertical detail enhancement signal Y$_V$ is a signal having frequencies extending only up to 750 kilohertz or 1 megahertz, speeding up the vertical detail enhancement signal before reinsertion into the luminance processing chain, permits one to use relatively low capacity memories as the 1-H memories for speed-up unit 237v.

What is claimed is:

1. Video signal processing circuitry, comprising:
   means for generating a luminance signal at a first line rate;
   means for generating a chrominance signal at said first line rate;
   a color matrix responsive to said luminance and chrominance signals for generating therefrom a first set of first, second and third color signals at said first line rate, each containing both luminance and chrominance information; and
   a time compression circuit coupled to the output of said color matrix for time compressing said first, second and third color signals that are generated at said first line rate to develop a time compressed second set of first, second and third color signals, each of the signals of said second set being developed at a faster, second rate that is a multiple of the first line rate.

2. Circuitry according to claim 1 including an additional video source for providing a third set of first, second and third color signals at said first line rate, each containing both luminance and chrominance information, and switching means coupled to said color matrix and to said additional video source for supplying to said time compression circuit a selected one of said first and third sets of three color signals to generate a correspondingly selected one of (a) the time compressed second set of three color signals and (b) a time compressed fourth set of three color signals derived from said third set of three color signals, wherein each of the three color signals of the time compressed fourth set is generated at said second line rate.

3. Circuitry according to claim 1 including means for generating first and second video enhancement signals, respectively containing vertical detail luminance information of opposite polarities and means responsive to said first and second video enhancement signals for restoring the vertical detail luminance information contained therein into the time compressed second set of three color signals such that alternate lines of each color signal in said time compressed second set contains vertical detail luminance information of opposite polarities.

4. Circuitry according to claim 3 wherein said luminance and chrominance signal generating means are included as part of a comb filter that receives a composite video signal for developing said luminance signal as a combed luminance signal at a first output terminal thereof and said chrominance signal as a combed chrominance signal at a second output terminal thereof, wherein the vertical detail information contained in said combed luminance signal is of less resolution than the vertical detail information contained in in said composite video signal.

5. Circuitry according to claim 3 including an additional video source for providing a third set of first, second and third color signals being developed at said first line rate, each containing both luminance and chrominance information, and switching means coupled to said color matrix and to said additional video source for supplying to said time compression circuit a selected one of said first and third sets of three color signals to generate a correspondingly selected one of (a) the time compressed second set of three color signals and (b) a time compressed fourth set of three color signals derived from said third set of three color signals, wherein each of the three color signals of the time compressed fourth set is generated at said second line rate.

6. Circuitry according to claim 5 wherein the vertical resolution of the luminance information contained in each of the three color signals of said third set is greater than the vertical resolution contained in the first mentioned luminance signal generated by said luminance signal generating means and wherein said time compression circuit selectively generates said fourth set of three color signals such that alternate lines of each time compressed color signal contains vertical detail information of the same polarity.

7. Circuitry according to claim 6 wherein said luminance and chrominance signal generating means are included as part of a comb filter that receives a composite video signal for developing said first mentioned luminance signal as a combed luminance signal at a first output terminal thereof and said chrominance signal as a combed chrominance signal at a second output terminal thereof wherein the vertical detail information contained in said combed luminance signal is of less resolution than the vertical detail information contained in in said composite video signal.

8. Circuitry according to claim 1 including means for generating a video enhancement signal at said first line rate that contains vertical detail luminance information, means including a second time compression circuit for generating a time compressed video enhancement signal of a first polarity and a time compressed video enhancement signal of the opposite polarity, and means for restoring the vertical detail luminance information contained in the two time compressed video enhancement signals into the time compressed second set of three color signals such that alternate lines of each color signal in said time compressed second set contains vertical detail luminance information of opposite polarities.

9. Circuitry according to claim 8 including an additional video source for providing a third set of first, second and third color signals at said first line rate, each containing both luminance and chrominance information, and switching means coupled to said color matrix and to said additional video source for supplying to said time compression circuit a selected one of said first and third sets of three color signals to generate a correspondingly selected one of (a) the time compressed second set of three color signals and (b) a time compressed fourth set of three color signals derived from said third set of three color signals, wherein each of the three color signals of the time compressed fourth set is generated at said second line rate.

* * * * *